(12) United States Patent
Tanner (10) Patent No.: US 10,774,973 B2
(45) Date of Patent: Sep. 15, 2020

(54) PIPE LINER RE-FLARING SYSTEM AND METHOD

(71) Applicant: Jeffrey M. Tanner, Zanesville, OH (US)

(72) Inventor: Jeffrey M. Tanner, Zanesville, OH (US)

( * ) Notice: Subject to any disclaimer, the term of this patent is extended or adjusted under 35 U.S.C. 154(b) by 245 days.

(21) Appl. No.: 15/800,475

(22) Filed: Nov. 1, 2017

(65) Prior Publication Data

US 2019/0128466 A1    May 2, 2019

(51) Int. Cl.
| | | |
|---|---|---|
| *B25B 27/14* | (2006.01) | |
| *F16L 55/165* | (2006.01) | |
| *F16L 55/18* | (2006.01) | |
| *F16L 55/1645* | (2006.01) | |
| *F16L 58/10* | (2006.01) | |
| *B29C 57/04* | (2006.01) | |
| *B29C 63/00* | (2006.01) | |

(52) U.S. Cl.
CPC .......... *F16L 55/1653* (2013.01); *B29C 57/04* (2013.01); *F16L 55/1645* (2013.01); *F16L 55/1656* (2013.01); *F16L 55/18* (2013.01); *F16L 58/1009* (2013.01); *B29C 63/0069* (2013.01)

(58) Field of Classification Search
USPC ....................... 29/278, 890.11, 450, 451, 505
See application file for complete search history.

(56) References Cited

U.S. PATENT DOCUMENTS

| | | | | |
|---|---|---|---|---|
| 3,596,931 A | * | 8/1971 | Mishler | F16L 15/003 285/55 |
| 4,277,091 A | * | 7/1981 | Hunter | F16L 58/181 285/369 |
| 5,730,472 A | * | 3/1998 | Krause | F16L 47/00 285/21.1 |

OTHER PUBLICATIONS https://www.zoro.com/ridgid-swaging-tool-set-4-pc-14-58-in-cap-52420/i/G1876901/; Swaging Tool Set Product Website; Rcvd and Printed Oct. 12, 2017.

(Continued)

*Primary Examiner* — Joseph J Hail
*Assistant Examiner* — Shantese L McDonald
(74) *Attorney, Agent, or Firm* — Neustel Law Offices (57) ABSTRACT

A pipe liner re-flaring system and method for use with a water pipe containing a pipe liner. The pipe liner re-flaring system and method generally include a compression coupling comprising a pair of female compression fittings and a dual ended male compression fitting connected between the female compression fittings. The female compression fittings are adapted to fit over and secure the lined water pipe and a second pipe to be joined with open ends of the pipe liner and the pipe to be joined in direct contact within the male compression fitting. A pipe liner expansion tool and a pipe liner flaring tool are used to expand and re-flare the open end of the pipe liner so that the pipe liner is in contact with an inner wall of the compression coupling to prevent leakage and contact between fluids flowing in the pipes and the material of the pipes and compression coupling.

11 Claims, 6 Drawing Sheets

(56) References Cited

OTHER PUBLICATIONS https://www.mscdirect.com/product/details/74783630; Ridgid—1/8 to 3/4 Inch Pipe Capacity, Flaring Tool and Tube Expander Product Website: Rcvd and Printed Oct. 12, 2017.
Ford Meter Box Company Ford Couplings for Pipe and Tubing Catalog: Oct. 2014.
Ford Pack Joint Coupling Product List; Rcvd Oct. 13, 2017.
A.Y. McDonald Mfg. Co. No-Lead Brass Fittings and Valves Product Catalog; Jan. 2013.
A.Y. McDonald Mfg. Co. Service Fitting Data Sheet; Feb. 2016.

* cited by examiner

PIPE LINER RE-FLARING SYSTEM AND METHOD

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a pipe liner re-flaring system and method for repairing lined pipe, and more specifically for repairing lined water pipe.

Related Art

Any discussion of the related art throughout the specification should in no way be considered as an admission that such related art is widely known or forms part of common general knowledge in the field.

Pipe lining is a non-invasive pipe rehabilitation process that can be completed without excavation or demolition of property. Pipe lining provides a time and money saving option for the rehabilitation of multiple types of existing pipe systems as compared to removal and replacement of the pipes. Pipe lining has been performed in the United States since the early 1970's. Initially, pipe lining technology was mainly used for large diameter sanitary and storm underground drainage piping in municipal infrastructures. However, as standards and specifications were adopted and as pipe lining technology advanced to become useable with relatively small diameter pipes, pipe lining technology became viable for use in residential and commercial piping system applications.

Pipe lining technology has evolved into multiple applications and industries. These include potable water services, cooling systems, hot water piping, swimming pool and fountain pipes, process piping, mechanical piping as well as electrical & telecommunication conduit. The technology now allows pipes and conduits as small as ½ inch in diameter to be lined. With the materials and installation processes now in use many liners have a life expectancy of fifty plus years.

One such pipe lining technology is the Neofit®+ Plus System. The Neofit®+ Plus System is a non-invasive pipe lining system for small diameter potable water service piping. The Neofit®+ Plus Liner seals small leaks and pinholes in ½" thru 2" ID service piping. It also acts as a barrier between existing lead piping and potable drinking water. The Neofit®+ Plus Liner is NSF-61 approved and has been tested to a minimum 50+ year life expectancy. The Neofit®+ Plus System is Manufactured by Wavin Overseas of The Netherlands and distributed by Flow-Liner, Ltd. of Zanesville, Ohio, U.S.A.

One method of installing a pipe liner, including the Neofit®+ Plus Liner, is described in U.S. Pat. No. 8,807,171, which is assigned to the inventor named in the present application, and which is incorporated herein in its entirety by reference. Briefly, a pipe liner having an outer diameter smaller than the inner diameter of the pipe to be lined is inserted into the pipe to be lined and secured at the ends. The pipe liner is typically constructed of a thermoplastic material such as polyethylene terephthalate (PET). The diameter of the pipe liner is then expanded into contact with the inner walls of the pipe. In the method described in the '171 patent, hot water generated by an in-line heater is flowed through the liner to soften and expand the material into contact with the inner walls of the pipe and cool compressed air is then flowed through the liner to cool the liner and cause it to set in the expanded state.

Like any other pipe, lined pipe is often used in environments in which it can be damaged. Like unlined pipe, damage to lined pipe can result in fluid leakage. In addition, in lined pipe the lining material acts as a protective barrier between fluid flowing in the pipe, such as potable water, and the pipe itself, which can include materials now known to be toxic, such as lead. Thus, in the case of lined pipe damage also can result in the fluid coming into contact with the pipe material and being polluted. Removal and replacement of lined pipe can be as expensive, if not more expensive, than unlined pipe. Thus, it is desirable to be able to repair damage to lined pipe in place and non-invasively if possible.

Repairing lined pipe typically involves cutting out and removing a damaged section of the pipe and replacing it with an undamaged section of pipe, which then connects on opposite ends to the undamaged lined pipe. Unlike repairing damaged sections of unlined pipe, adequately repairing lined pipe requires special attention to the pipe liner to ensure a fluid-tight connection is achieved with the replacement pipe section and that fluid flowing in the pipes does not come into contact with the materials of the pipes or the connections between the undamaged sections of pipe and the replacement pipe section and possibly become contaminated.

Even when a lined pipe is not damaged, there may be circumstances when it is necessary or desirable to cut it open or remove a section. For example, it may be desired to install a connection for a branch line that is to run from a lined pipe. Similar considerations apply when installing fittings in a lined pipe to connect a branch line as when installing fittings to connect a section of replacement pipe.

There thus exists a need for a system and method to re-flare lined pipe that has been cut open or had a section removed to repair damage or for other reasons, including potable water pipe lined according to the Neofit®+ Plus System. There is also a need for such a system and method that is non-invasive and cost effective, and that does not require removal and replacement of large sections of pipe. There is also a need for such a system and method that is easy to employ. There is further a need for such a system and method that is useable with pipes of a variety of diameters and materials, such as lead, steel, copper, and galvanized iron. Finally, there is a need for such a system and method that have minimal effect on flow rate of fluids in the pipes and connections.

The example embodiments of a pipe liner re-flaring system and method disclosed herein are directed to addressing the foregoing needs and the foregoing and other problems of the prior art.

SUMMARY

An example embodiment is directed to a pipe liner re-flaring system and method for use in re-flaring a first pipe containing a pipe liner, such as Neofit®+ Plus Liner, to facilitate joining the first pipe with a second pipe. An example pipe liner re-flaring system includes a compression coupling having first and second ends and a central section between the first and second ends with a hollow interior and an inner surface, a pipe liner flaring tool, and a pipe liner expansion tool. The first and second ends of the compression coupling are adapted to fit over and to secure the first pipe containing the pipe liner and the second pipe to be joined respectively, with a first portion and first open end of the pipe liner and a second open end of the second pipe enclosed within the central section of the compression coupling and with the first open end of the pipe liner and second open end of the second pipe in direct contact.

The pipe liner expansion tool is adapted to expand the first portion of the pipe liner into contact with the inner surface of the central section of the compression coupling to prevent leakage and contact between fluids and the material of the compression fitting. The pipe liner flaring tool is adapted to re-flare the edge of the pipe liner adjacent the first open end of pipe liner where the first open end is to be in contact with the second open end of the second pipe.

In a preferred embodiment, the second open end of the second pipe is within the expanded and flared first open end of the pipe liner. In one embodiment, the first and second ends of the compression coupling comprise female compression fittings and the central section comprises a dual ended male compression fitting. In one embodiment, the first and second female compression fittings have first and second adjustable collars for securing the first and second pipes.

Similarly, an example pipe liner re-flaring method includes cutting open a section of first pipe containing a pipe liner to expose a first portion of the pipe liner having a first open end. The example method further includes providing a compression coupling having a first end, a second end, and a central section between the first and second ends with a hollow interior and an inner surface. The example method further comprises introducing the first portion of the pipe liner with the first open end through the first end of the compression coupling into the interior of the central section and securing the first end of the compression coupling with the first pipe. The example method further comprises radially expanding the first portion of the pipe liner into contact with the inner surface of the central section, and radially flaring the first open end of the pipe liner. The example method further comprises introducing a second open end of a second pipe through the second end of the compression coupling into the interior of the central section with the second open end of the second pipe in direct contact with the first open end of the pipe liner. The example method further comprises securing the second end of the compression coupling to the second pipe.

There has thus been outlined, rather broadly, some of the embodiments of the pipe liner re-flaring system and method in order that the detailed description thereof may be better understood, and in order that the present contribution to the art may be better appreciated. There are additional embodiments of the pipe liner re-flaring system and method that will be described hereinafter and that will form the subject matter of the claims appended hereto. In this respect, before explaining at least one embodiment of the pipe liner re-flaring system and method in detail, it is to be understood that the pipe liner re-flaring system and method are not limited in their application to the details of construction or to the arrangements of the components set forth in the following description or illustrated in the drawings. The pipe liner re-flaring system and method are capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview.

An example pipe liner re-flaring system adapted for re-flaring a pipe liner contained within a pipe, including a potable water pipe lined with Neofit®+ Plus Liner, generally comprises a compression coupling having a first end, a second end, and a central section between the first end and second end having a hollow interior and inner surface. The first and second ends may comprise first and second female compression fittings and the central section may comprise a dual ended male compression fitting connected between the female compression fittings. The example system also includes a specially adapted pipe liner expansion tool and a pipe liner flaring tool.

The first and second female compression fittings are adapted to fit over and to secure respectively a first pipe containing a pipe liner with an exposed first portion having a first opening and a second pipe having a second opening. The first and second pipes are secured with the first portion and first open end of the pipe liner and the second open end of the second pipe enclosed within the central section of the compression coupling in direct contact, preferably with the second open end of the second pipe within the first open end of the pipe liner.

The pipe liner expansion tool is adapted to expand the first portion of the pipe liner into contact with the inner surface of the male compression fitting to prevent leakage and contact between fluids and the materials of the compression coupling or pipes. The pipe liner expansion tool includes a radially expandable expansion head. The expansion head is inserted into the first open end of the pipe liner and caused to radially expand to expand the first portion of the pipe liner into contact with the inner surface of the male compression fitting.

The pipe liner flaring tool is adapted to re-flare the edge of the liner adjacent the first open end where the pipe liner is to be contacted by the second open end of the second pipe. This facilitates fluid-tight contact between the second open end of the second pipe and the first open end of the pipe liner, and preferably introduction of the second open end within the first open end. The pipe liner flaring tool includes a shaped tip. The tip is inserted into the first open end of the pipe liner and manually manipulated to re-flare the open end of the pipe liner.

An example pipe liner re-flaring method includes cutting a section of the first pipe to expose the first portion of pipe liner with the first opening, introducing the first portion of the pipe liner through the first female compression fitting into the male compression fitting, securing the first female compression fitting to the first pipe, using the pipe liner expanding tool and the pipe liner flaring tool to expand and re-flare the first portion of the pipe liner and first opening of the pipe liner respectively, inserting the second open end of the second pipe through the second female compression fitting into the male compression fitting with the second open end in direct contact with the first open end of the pipe liner, and securing the second compression fitting to the second pipe.

B. Compression Coupling.

Figure 1:
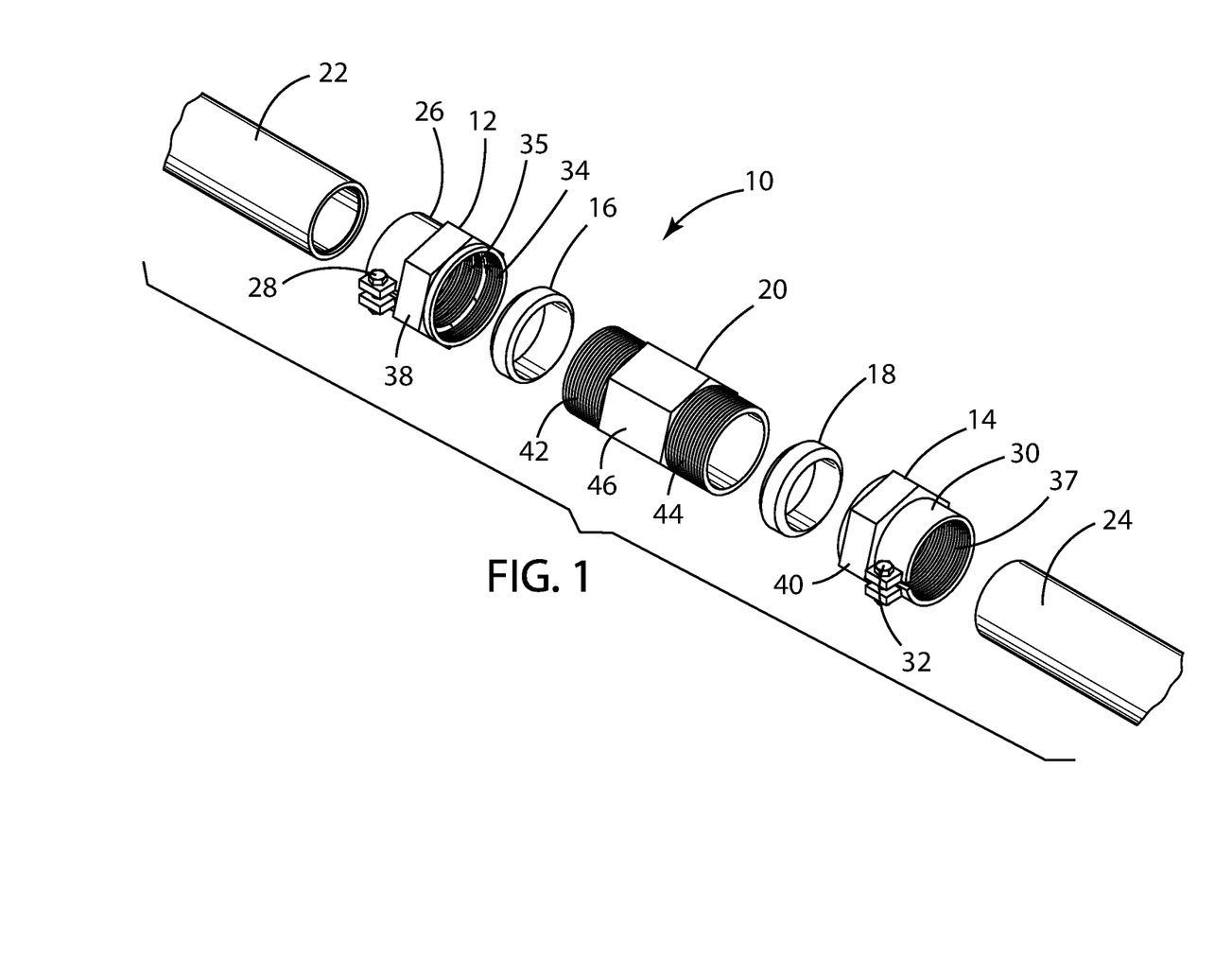
FIG. 1 is an exploded perspective view of components of a pipe liner re-flaring system in accordance with an example embodiment.
Figure 2:
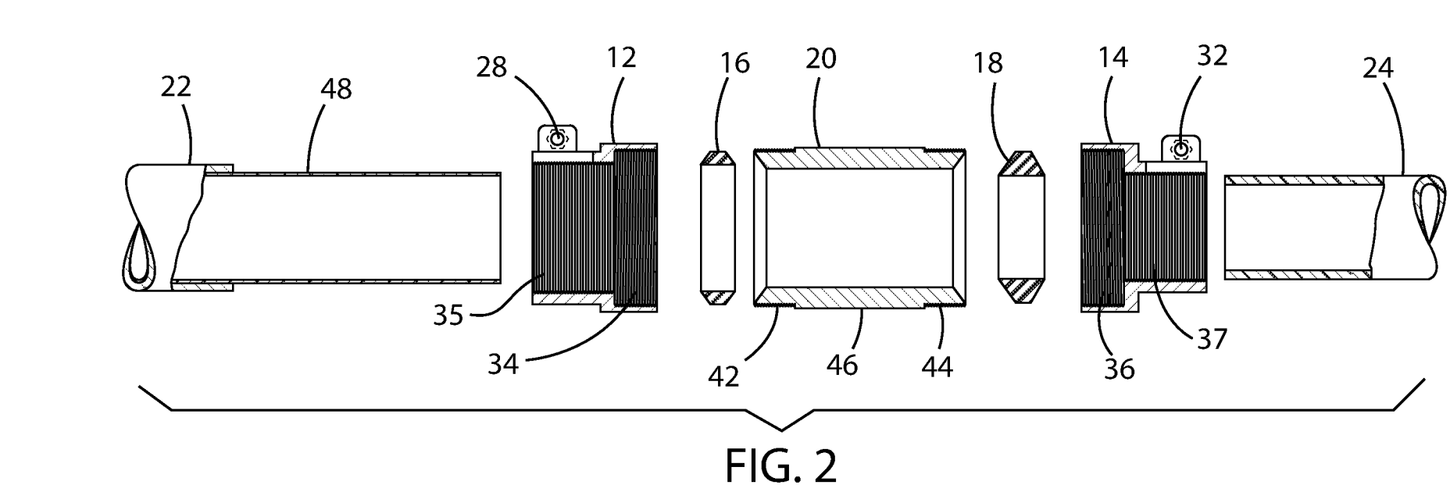
FIG. 2 is an exploded cross-sectional side elevation view of components of a pipe liner re-flaring system in accordance with an example embodiment.
Figure 3:
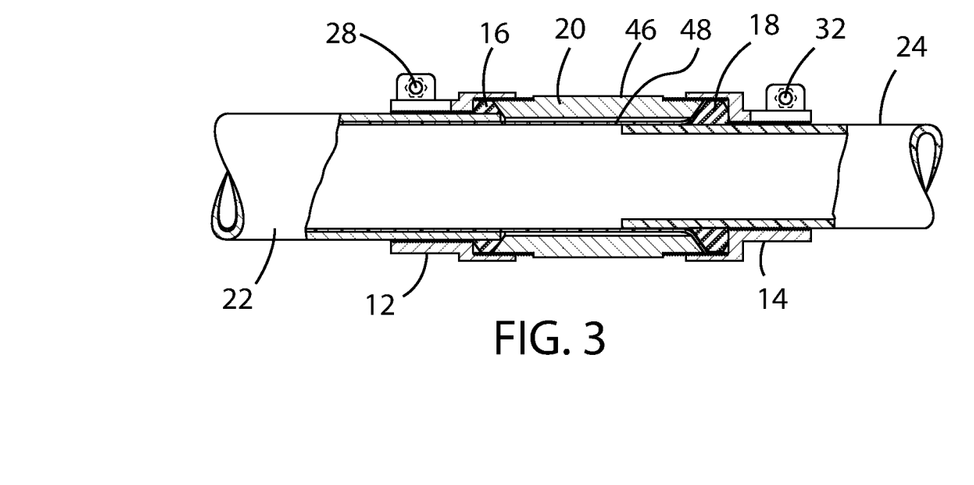
FIG. 3 is a cross-sectional side elevation view of components of a pipe liner re-flaring system in accordance with an example embodiment.
Figures 4A, 4B, 4C, 4D, 4E:
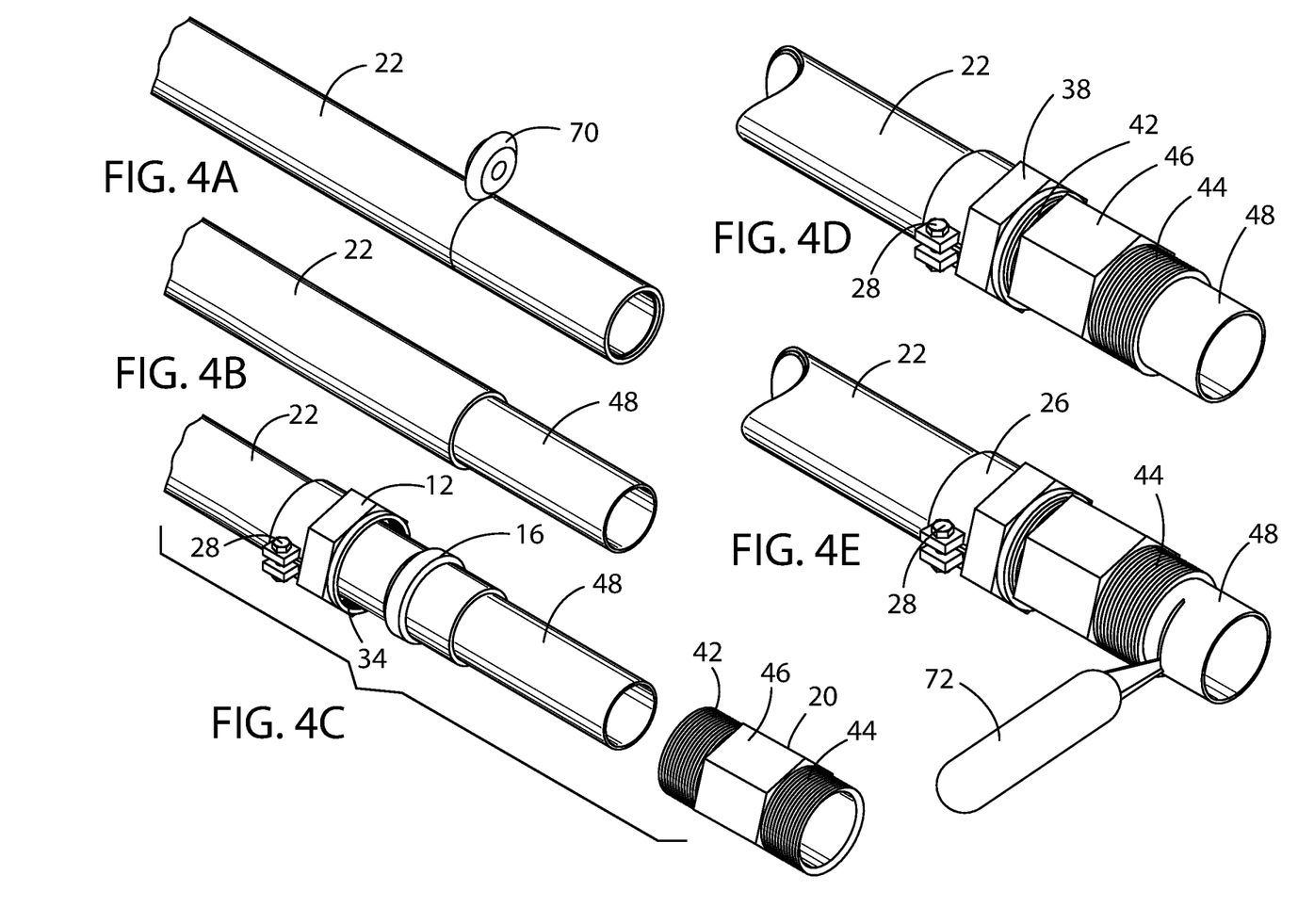
FIGS. 4A-4E are perspective views showing components and steps of a pipe liner re-flaring system and method in accordance with an example embodiment.

Referring to FIGS. 1-3, the example pipe liner re-flaring system includes a compression coupling 10 having first and second ends comprising first and second female compression fittings 12, 14 respectively, and a central section comprising a a dual ended male compression fitting 20. A pair of beveled rubber gaskets 16, 18 help provide a fluid-tight seal between the first and second female compression fittings 12, 14 and the dual ended male compression fitting 20. When assembled as described below, the compression coupling 10 is adapted to be secured to and to provide a fluid-tight connection between a first pipe 22 containing a pipe liner 48 and a second pipe 24. For example, first pipe 22 may be a pipe that had a damaged section cut out and second pipe 24 may be a new pipe section to be joined with pipe 22. Alternatively, first and second pipes 22, 24 may be sections of the same pipe that have been cut apart to remove a damaged section or to install a fitting for a branch line, and which are to be rejoined either directly, via a new section of pipe (not shown), or with a T-type or other branch fitting (not shown).

1. Female Compression Fittings.

First and second female compression fittings 12, 14 are preferably substantially cylindrical fittings and are adapted to slide over and be secured to respective pipes 22, 24 to be fluidly connected. The inner diameters of the first and second female compression fittings 12, 14 are preferably slightly larger than the outer diameters of the respective first and second pipes 22, 24 to facilitate fitting the female compression fittings over the pipes and securing them to the pipes. Additionally, the relatively larger inner diameters of the female compression fittings allow fluid to flow through the pipes and the compression coupling 10 without substantial restriction. The first and second female compression fittings 12, 14 include respective first and second adjustable locking collars 26, 30 and locking bolts 28, 32. By tightening the locking bolts 28, 32, the inner diameters of the locking collars 26 are reduced until they clamp around and securely engage the outer surfaces of the respective pipes 22, 24. The inner surfaces of the locking collars 26, 30 are provided with circumferential parallel grooves 35, 37 to enhance the engagement with the respective pipes 22, 24.

The inner surfaces of the first and second female compression fittings 12, 14, preferably have respective threaded sections 34, 36 adapted to engage with corresponding threaded sections 42, 44 of opposite ends of the male compression fitting 20 as described further below. The outer surfaces of the female compression fittings preferably include respective annular nuts 38, 40 to facilitate connection and tightening to the male compression fitting 20 to assemble the complete compression coupling 10. Also preferably, the inner diameters of the female compression fittings 12, 14 are dimensioned to receive and retain respective rubber gaskets 16, 18 to provide a fluid-tight seal between the female compression fittings 12, 14 and the male compression fitting 20 when the compression coupling 10 is fully assembled as shown in FIG. 3.

Female compression fittings as described above are conventional and well known to persons skilled in the art. They are widely available at many commercial plumbing supply and hardware stores, including for example A.Y. McDonald Mfg. Co. of Dubuque, Iowa and Ford Meter Box Co. of Wabash, Ind.

2. Male Compression Fitting.

The male compression fitting 20 is preferably a substantially cylindrical dual ended male fitting with a hollow interior and a substantially smooth inner surface. The exterior surface of the male compression fitting has two threaded sections 42, 44 located at the opposite ends of the male compression fitting. The threaded sections 42, 44 are located and configured to engage the respective threaded sections 34, 36 of the female compression fittings 12, 14 for assembly of the compression coupling 10 as shown in FIG. 3. The exterior surface of the male compression fitting also has an annular nut 46 located between the threads 42, 44. The annular nut facilitates connection and tightening of the male compression fitting to the female compression fittings 12, 14 to form the compression coupling 10.

The outer diameter of the male compression fitting in the threaded sections 42, 44 corresponds closely to the inner diameters of the respective female compression fittings 12, 14 in the respective threaded sections 34, 36 so that the male and female compression fittings may be tightly connected and the compression coupling 10 may provide a fluid-tight conduit for the flow of fluids between the first and second pipes 22, 24. The inner diameter of the male compression fitting preferably is dimensioned to be substantially the same as the inner diameter of the first and second pipes 22, 24, to be joined so that the compression coupling does not substantially interfere with the flow of fluids between the pipes. Also preferably, the edges surrounding the open opposite ends of the male compression fitting immediately adjacent to the threaded sections 34, 36 are beveled to engage the beveled edges of the rubber gaskets 16, 18 when the male and female compression fittings are threaded together to assist in providing a fluid-tight seal.

Although not shown, persons skilled in the art will appreciate that the male compression fitting 20 also may be a T-type or similar fitting with one or more additional ports or openings. Typically but not always such ports are located in the mid-section of the male compression fitting and are oriented substantially perpendicularly to the longitudinal axes of the male compression fitting and first and second pipes. This type of male compression fitting is useful to connect one or more branch lines (not shown) so that fluid flowing between pipes 22 and 24 also can flow in one or more branch lines and vice versa.

Male compression fittings as described above are conventional and well known to persons skilled in the art. They are widely available at many commercial plumbing supply and hardware stores, including for example A.Y. McDonald Mfg. Co. of Dubuque, Iowa and Ford Meter Box Co. of Wabash, Ind.

3. Compression Coupling Assembly.

Referring primarily to FIGS. 2-3, the complete compression coupling 10 assembly comprises the first and second female compression fittings 12, 14 with respective rubber gaskets 16, 18 retained therein tightly threaded onto the opposite ends of the male compression fitting 20 via the respective female threads 34, 36 and respective male threads 42, 44. Tightening of the male and female compression fittings to complete the assembly may be accomplished using conventional hand tools, such as wrenches, sockets, or pliers and the annular nuts 38, 40 of the female compression fittings and annular nut 46 of the male compression fitting.

In general, the compression coupling 10 provides a fluid-tight connection and conduit for the flow of fluids between opposing open ends of the first and second pipes 22, 24. More particularly, the compression coupling 10 provides a fluid-tight connection and conduit for fluid flow between a pipe 22 containing a pipe liner 48, such as a Neofit® Liner, and a second pipe 24, which may or may not also contain a pipe liner.

A portion of the pipe liner 48 having a first opening is preferably left exposed and extending from the open end of the first pipe 22. As best shown in FIG. 3, a sufficient length of the pipe liner 48 is preferably left exposed so that the pipe liner 48 extends entirely through the body of the first female compression fitting 12 and into the hollow interior of the male compression fitting 20, preferably to the end of the male compression fitting opposite the first female compression fitting. The outer surface of the pipe 22 preferably extends only through the body of the first female compression fitting 12 to the outer edge of the male compression fitting 20 adjacent the threaded section 42.

The locking bolt 28 of the first female compression fitting 12 is tightened to cause the locking collar 26 to clamp securely around the outer surface of the first pipe 22. This securely engages the first end of the compression coupling 10 to the first pipe 22. As explained in further detail below, the exposed first open end of the pipe liner 48 is expanded and re-flared.

The second open end of the second pipe 24 to be joined with the lined pipe 22 extends entirely through the body of the second female compression fitting 14 and into the hollow interior of the male compression fitting 20. The second open end of the second pipe 24 extends into direct contact with the expanded and flared first open end of the pipe liner 48 of pipe 22, and preferably extends within the flared and expanded first open end.

The locking bolt 32 of the second female compression fitting 14 is tightened to cause the locking collar 30 to clamp securely around the outer surface of the second pipe 24. This securely engages the second end of the compression coupling 10 to the second pipe 24.

With a fluid-tight connection established between the first and second female compression fittings 12, 14 and the male compression fitting 20, the first and second female compression fittings secured to the first and second pipes 22, 24, and the second open end of the second pipe 24 in direct contact with the first open end of the pipe liner 48 of the first pipe 22 within the hollow interior of the male compression fitting 20, the compression coupling 10 provides a fluid-tight connection and conduit for fluid flow between the first and second pipes 22, 24.

C. Pipe Liner Expansion Tool.

Figure 5A:
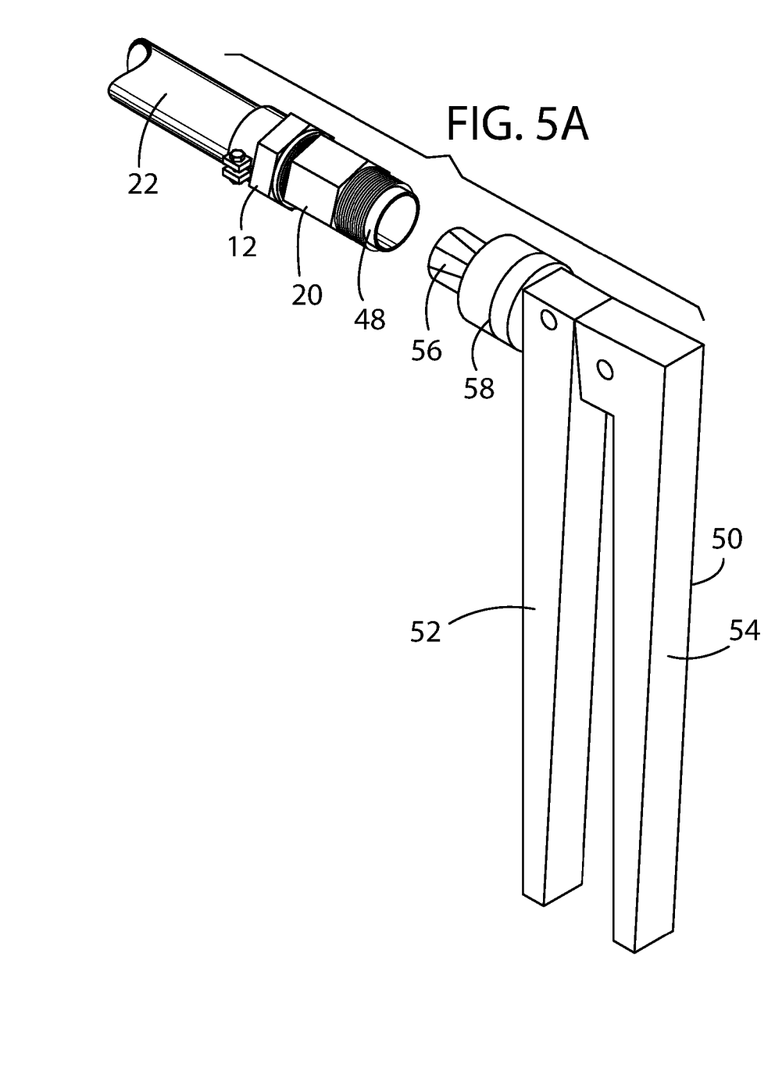
FIGS. 5A and 5B are perspective views showing a pipe liner expansion tool and related steps of a pipe liner re-flaring system and method in accordance with an example embodiment.
Figure 5B:
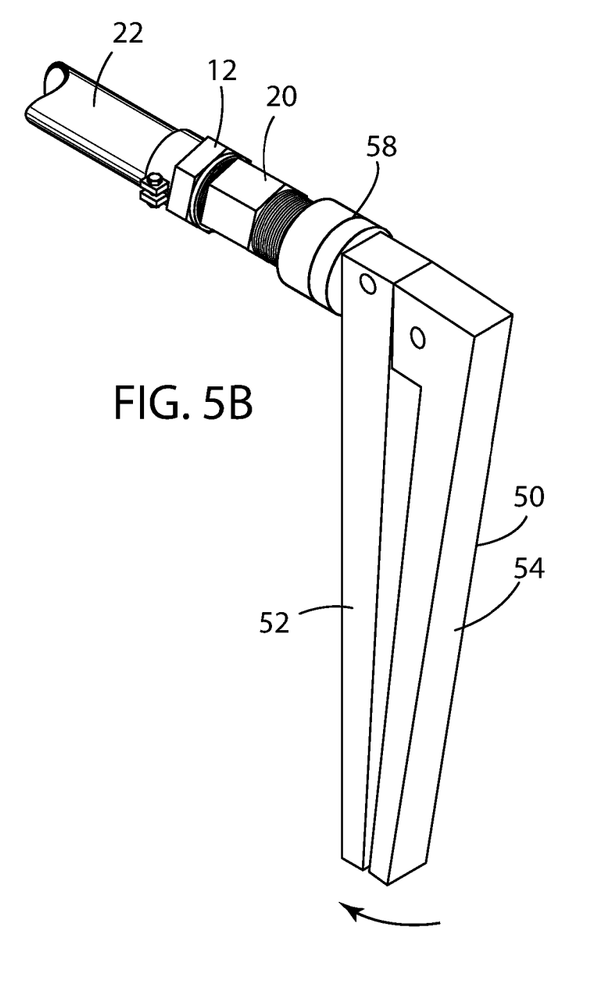

Referring to FIGS. 5A and 5B, a pipe liner expansion tool 50 is shown. The pipe liner expansion tool 50 is adapted to expand at least the portion of the pipe liner 48 adjacent the first open end of the pipe liner into contact with the inner surface of the interior of male compression fitting 20. This is to ensure that fluid flowing through the male compression fitting 20 is in contact only with the material of the pipe liner 48 and does not come into contact with the material of the male compression fitting 20, first female compression fitting 12, or first pipe 22. A preferred pipe liner expansion tool 50 is a swage tool also known as an expansion tool.

The pipe liner expansion tool 50 has a fixed handle 52 and a pivoting handle 54 connected to the fixed handle. The pivoting handle 54 is connected to the fixed handle 52 via a pivot pin or hinge (not shown). A drive rod (not shown) is attached to the pivoting handle 54 near the pivot pin or hinge. A passage (not shown) extending through the fixed handle 52 near the pivot pin or hinge encloses the drive rod. As the pivoting handle is moved and pivots relative to the fixed handle 52, the drive rod articulates back and forth within and through the passage.

A substantially cylindrical expansion head 56 is attached to the side of the fixed handle 52 opposite the hinge via a coupling 58. The coupling 58 is adapted to releasably attach expansion head 56 to facilitate the use of expansion heads of various diameters to provide for expansion of pipe liners of various diameters. As the pivoting handle 54 is pivoted toward the fixed handle 52 as shown in FIG. 5B, the drive rod engages the expansion head 56 through coupling 58 and causes it to expand radially outwardly in a substantially circular direction.

The pipe liner expansion tool 50, and more specifically the expansion head 56, is constructed of metal or another suitable material that can be heated repeatedly to at least approximately 200 degrees F. without damage or deformation. If desired, the handles 52, 54 may be provided with thermally insulating cover material (not shown) to facilitate handling the tool when it has been heated. In one embodiment, the pipe liner expansion tool 50 may have an integral interior or exterior heating element (not shown). The heating element may be an electrical resistive-type heating element constructed of metal or ceramic. For example, the heating element may be mounted within or on an exterior surface of the coupling 58 in direct or indirect contact with the expansion head 56. The coupling 58 may itself be constructed of a heat conducting material, such as a suitable metal, to facilitate the conduction of heat from the heating element to the expansion head 56. Electrical wires for powering the heating element may be routed through a passage or hollow space in either of handles 52, 54.

As described in further detail below, the pipe liner expansion tool 50 may be used to expand the diameter of the pipe liner 48 so that the outer surface of at least the portion of the pipe liner 48 adjacent to the first opening of the pipe liner 48 is in contact with the inner surface of the interior of the male compression fitting 20.

D. Pipe Liner Flaring Tool.

Figures 6A, 6B, 6C:
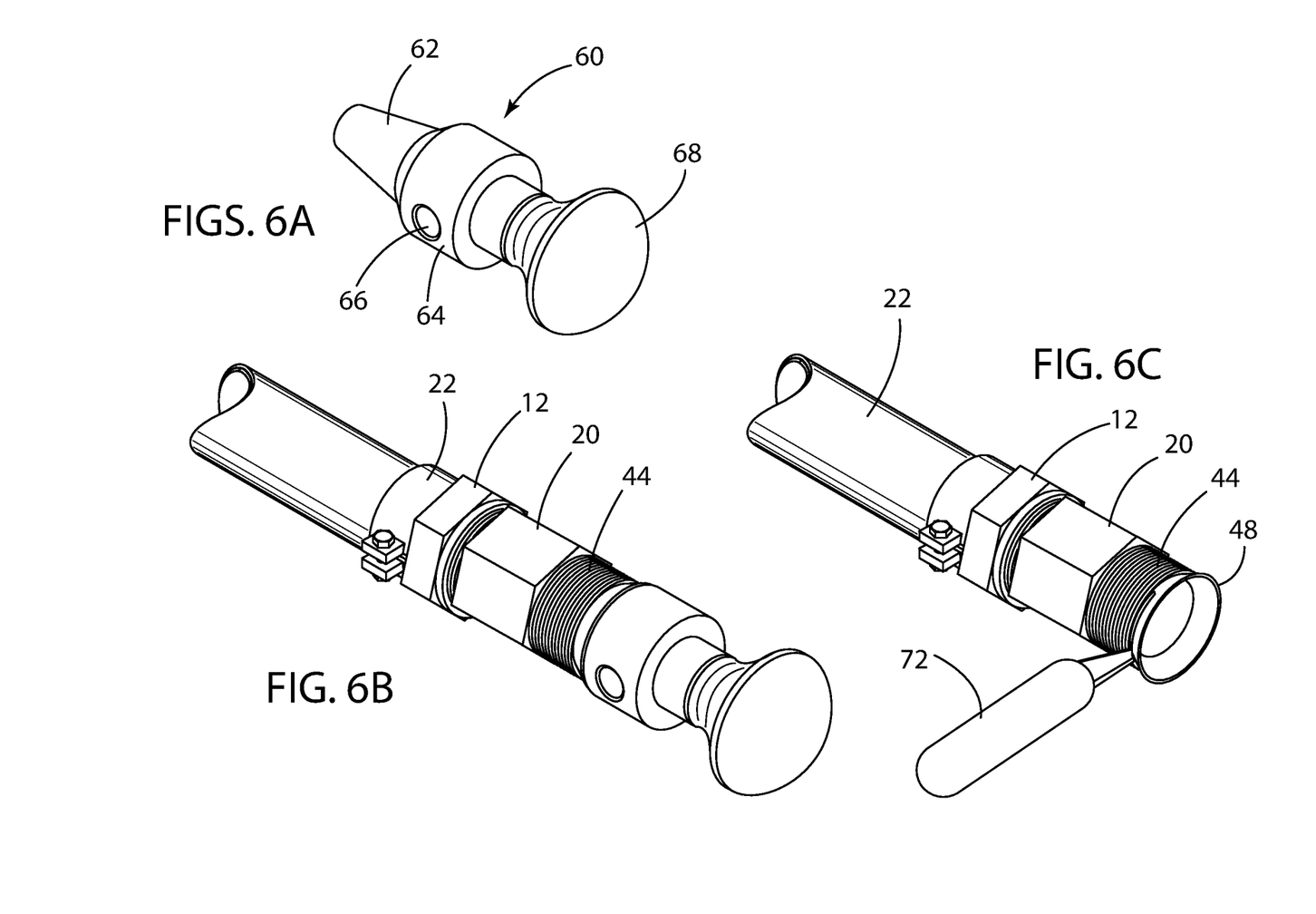
FIGS. 6A-6C are perspective views showing a pipe liner re-flaring tool and related steps of a pipe liner re-flaring system and method in accordance with an example embodiment.

Referring to FIG. 6A, a pipe liner flaring tool 60 is shown. The pipe liner flaring tool 60 is adapted to radially flare the first open end of the pipe liner 48, preferably into contact with the beveled outer edge of the male compression fitting 20 adjacent the threaded section 44. This is to ensure that fluid flowing through the male compression fitting 20 is in contact only with the material of the pipe liner 48 and does not come into contact with the material of the male compression fitting 20, first female compression fitting 12, or the first pipe 22. In addition, flaring the first open end of the pipe liner 48 facilitates direct contact between the first open end of the pipe liner 48 and the second open end of the second pipe 24 and, preferably, introduction of the second open end of the second pipe within the first open end of the pipe liner 48.

The pipe liner flaring tool 60 has a tip 62, a central section 64, and a knob or handle 68. The tip 62 is shaped substantially in the shape of the desired flare. In the example embodiment, the tip is substantially frusto-conical-shaped. The tip 62 and central section 64 may be constructed as a unitary piece or as separate pieces and joined with a threaded fitting or in another suitable fashion. In either case, the tip 62 and central section 64 are preferably constructed from stainless steel or a similar metal with good thermal conduction properties and that can be heated repeatedly to at least approximately 200 degrees F. without damage or deformation. The angle of the sides of the tip 62 substantially determine the angle of the flare the tool 60 will impart to the first open end of the pipe liner 48.

The knob or handle 68 is preferably formed as a separate piece and is connected to the central section 64 in any suitable fashion. The knob or handle 68 preferably is constructed of a material with good thermal insulating properties so that when the tip is heated to facilitate flaring the first open end of the pipe liner, the flaring tool 60 can still be manually manipulated via the knob or handle 68.

A substantially cylindrical opening 66 extends laterally through the central section 64 and is adapted to receive an elongated rod (not shown). The elongated rod may be used to provide leverage to facilitate rotating the pipe flaring tool 60 while simultaneously applying pressure to the knob 68 to achieve uniform and optimal flaring results. In addition or alternatively, the knob 68 can be connected to the central section 64 via an elongated rod (not shown). This not only provides additional leverage but increases the distance between the tip 62 and the knob 68 to reduce the chance of a user's hand being singed while using the tool with the tip heated.

In one embodiment, the pipe liner flaring tool 60 may have an integral interior or exterior heating element (not shown). The heating element may be an electrical resistive-type heating element constructed of metal or ceramic. For example, the heating element may be mounted within or on an exterior surface of the tip 62 or the central section 64 in direct or indirect contact with the tip 62. Electrical wires for powering the heating element may be routed through passages or hollow spaces in the tip 62 and/or central section 64.

E. Method of Use and Operation of Preferred Embodiment.

Referring initially to FIGS. 4A-4E, a method of use and operation of the example pipe liner re-flaring system are described below.

First, a section of the first pipe 22 that includes a damaged section to be replaced or the location where a branch fitting is to be installed is cut open using a standard wheel style pipe cutter 70 or similar tool. The damaged section of pipe, if any, is removed. Approximately 1½ inches is then removed from the end of the first pipe 22, again using a standard wheel style pipe cutter 70 or similar tool, leaving a first portion of the pipe liner 48 with a first open end exposed. Next, the female compression fitting 12 and rubber gasket 16 are slid over the pipe liner 48 and first pipe 22 so that the first pipe 22 and pipe liner 48 extend completely through the body of the female compression fitting 12 and the first portion and first open end of the pipe liner are left exposed. The dual-ended male compression fitting 20 is then slid over the pipe liner 48 and first pipe 22. The first female compression fitting 12 and the male compression fitting 20 are positioned on the first pipe 22 so that the edge of the open end of the first pipe 22 is positioned within the body of the male compression fitting 20 against the beveled outer edge of the male compression fitting 20 adjacent the threaded section 42. The male and female compression fittings 20, 12 are then connected together by screwing the threaded section 42 of the male compression fitting 20 into the threaded section 34 of the female compression fitting 12 and tightening the connection using conventional hand tools and the annular nuts 38 and 46 on the respective female and male compression fittings.

With the edge of the open end of the first pipe 22 abutting against the beveled outer edge of the male compression fitting 20 adjacent the threaded section 42, the first portion of the pipe liner 48 extends entirely through the bodies of the first female compression fitting 12 and the male compression fitting 20 and protrudes approximately ¾-1 inch beyond the end of the male compression fitting adjacent the threaded section 44. The locking bolt 28 on the side of the female compression fitting 12 is then tightened, causing the locking collar 26 to clamp the female compression fitting 12 and attached male compression fitting 20 to the first pipe 22, thus securing the first end of the compression coupling 10 to the first pipe 22. Using a sharp razor blade tool 72 or similar tool, the exposed pipe liner 48 is cut so approximately ¼ inch protrudes from the open end of the male compression fitting 20 just beyond the threaded section 44.

Referring now to FIGS. 5A and 5B, the pipe liner expansion tool 50 with the correct expansion head 56 for the diameter of the pipe liner 48 and interior of the male compression fitting 20 is used to expand the pipe liner 48 against the inner surface of the interior of the male compression fitting 20. The expansion head is first preheated to approximately 200 degrees F. either using an external heat source, such as a heat gun, or the integral heating element if the expansion tool is so equipped. The expansion head 56 is then inserted into the exposed first open end of the pipe liner 48 and the pivoting handle 54 of the pipe liner expansion tool is slowly closed to slowly radially expand the expansion head 56. The radial expansion of the expansion head in turn expands the diameter of the portion of the pipe liner 48 inside and adjacent to the first open end of the pipe liner and causes the outer surface of the pipe liner to contact the inner surface of the interior of the male compression fitting 20. This prevents fluids from flowing outside the pipe liner 48 in contact with the material of the male compression fitting 20, first female compression fitting 12, or first pipe 22 and possibly becoming contaminated. During the expansion procedure, the pre-heated expansion head transfers heat to the pipe liner, which is typically a thermoplastic such as PET. This in turn softens the pipe liner rendering it more formable and less likely to tear during the expansion procedure. Expanding the expansion head slowly also helps prevent the pipe liner from splitting or tearing.

Referring now to FIGS. 6B and 6C, once the pipe liner 48 has been expanded, the pipe liner flaring tool 60 is used to re-flare the exposed first open end of the pipe liner. The tip 62 of the pipe liner flaring tool is first pre-heated to approximately 200 degrees F. either using an external heat source, such as a heat gun, or the integral heating element if the flaring tool is so equipped. Then the tip 62 is slowly pressed against the exposed open end of the pipe liner 48 until the edge of the pipe liner is flared against the annular beveled edge of the male compression fitting 20 adjacent to the threaded section 44. Once the edge of the pipe liner 48 is flared against the annular beveled edge of the male compression fitting, the flaring tool is quickly removed. As with the expansion of the pipe liner 48, re-flaring the edge of the first open end of the pipe liner 48 against the beveled edge of the male compression fitting 20 prevents fluids from flowing outside the pipe liner 48 in contact with the material of the male compression fitting 20, first female compression fitting 12, or first pipe 22. The flaring also assists in ensuring that when the second open end of the second pipe 24 is inserted into the interior of the male compression fitting 20, the second open end of the second pipe 24 at least directly abuts and preferably enters within the first open end of the pipe liner 48 so that fluid flows directly between the second open end of the second pipe 24 and the interior of the pipe liner 48 without contacting any material of the components of the compression coupling 10 or the first pipe 22. As with the expansion procedure described above, during the flaring procedure, the pre-heated tip 62 transfers heat to the pipe liner, which softens the pipe liner making it more formable and less likely to split or tear during the re-flaring procedure. Re-flaring the pipe liner slowly also helps prevent the pipe liner from splitting or tearing during the procedure. Once the exposed open first end of the pipe liner 48 is re-flared, it is trimmed flush with the annular beveled edge of the male compression fitting 20 using a sharp razor blade tool 72 or similar tool.

Figures 7A, 7B:
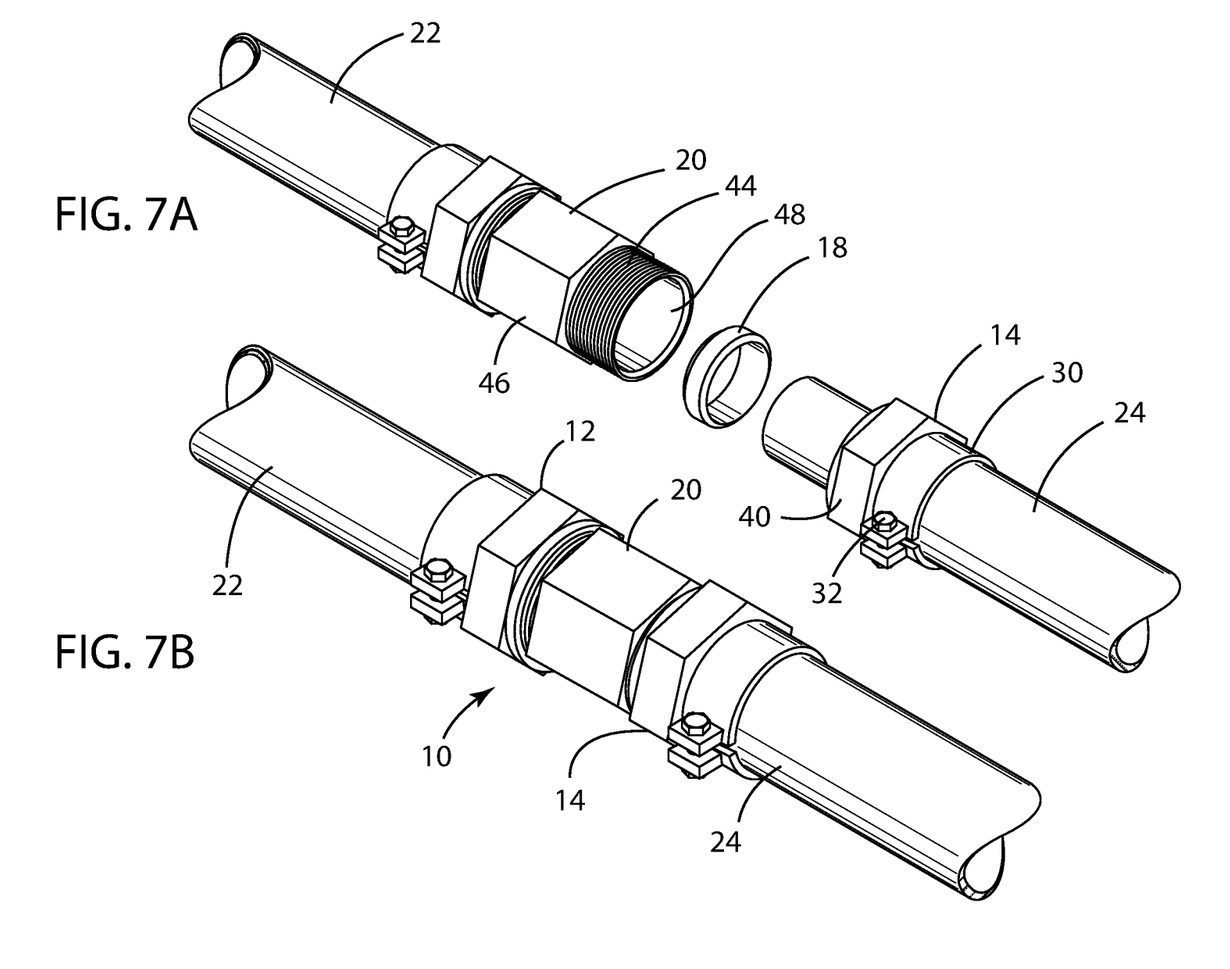
FIGS. 7A-7B are perspective views showing components and steps of a pipe liner re-flaring system and method in accordance with an example embodiment.

Referring to FIGS. 7A and 7B, next the second female compression fitting 14 and rubber gasket 18 are slid onto the second pipe 24 with the second pipe 24 extending completely through the body of the second female compression fitting 14 and the second open end being exposed. The second open end is aligned with and brought into direct contact with the expanded and flared first open end of the pipe liner 48 at the outer edge of the male compression fitting 20 adjacent to the threaded section 44. Depending on the relative diameters of the expanded and flared first open end of the pipe liner 48 and the second open end of the second pipe 24, the second open end of the second pipe 24 may be able to be manually introduced within the first open end of the pipe liner 48. Regardless, with the second open end of the second pipe 24 aligned and in contact with the first open end of the pipe liner 48, the second female compression fitting 14 and male compression fitting 20 are connected by screwing the threaded section 36 of the second female compression fitting onto the threaded section 44 of the male compression fitting. The connection is tightened using conventional hand tools and the annular nuts 40 and 46 on the respective female and male compression fittings. Finally, the locking bolt 32 on the side of the female compression fitting 14 is tightened, causing the locking collar 30 to clamp the female compression fitting 14 to the outer surface of the second pipe 24, thus securing the second end of the compression coupling 10 the second pipe 24. At this point, a fluid-tight connection and conduit is established between the pipe liner 48 of the first pipe 22 and the second pipe 24.

Unless otherwise defined, all technical and scientific terms used herein have the same meaning as commonly understood by one of ordinary skill in the art to which this invention belongs. Although methods and materials similar to or equivalent to those described herein can be used in the practice or testing of the pipe liner re-flaring system, suitable methods and materials are described above. All publications, patent applications, patents, and other references mentioned herein are incorporated by reference in their entirety to the extent allowed by applicable law and regulations. The pipe liner re-flaring system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:
1. A pipe liner re-flaring system, comprising:
a first pipe containing a pipe liner, wherein the pipe liner includes a first portion and a first open end, wherein the first open end is exposed;
a second pipe including a second open end;
a compression coupling having a first end, a second end, and a central section between the first and second ends;
wherein the central section has a hollow interior with an inner surface;
wherein the first end is adapted to be secured to the first pipe with the first portion and first open end of the pipe liner enclosed within the hollow interior;
wherein the second end is adapted to be secured to the second pipe with the second open end of the second pipe enclosed within the hollow interior in direct contact with the first open end of the pipe liner;
a pipe liner expansion tool adapted for insertion within the first open end of the pipe liner, wherein the pipe liner expansion tool is operable to engage the pipe liner near the first open end to radially expand the liner into contact with the inner surface of the central section of the compression coupling; and
a pipe liner flaring tool adapted for insertion within the first open end of the pipe liner, wherein the pipe liner flaring tool is operable to engage the first open end to radially flare the first open end where the first open end is to be in contact with the second open end of the second pipe.

2. The pipe liner re-flaring system of claim 1, wherein the second open end of the second pipe being enclosed within the hollow interior in direct contact with the first open end of the pipe liner includes the second open end of the second pipe being within the first open end of the pipe liner.

3. The pipe liner re-flaring system of claim 1, wherein:
the first end of the compression coupling comprises a first female compression fitting;
the second end of the compression coupling comprises a second female compression fitting; and
the central section of the compression coupling comprises a male compression fitting.

4. The pipe liner re-flaring system of claim 3, wherein:
the first female compression fitting has a first adjustable collar for securing to the first pipe; and
the second female compression fitting has a second adjustable collar for securing to the second pipe.

5. The pipe liner re-flaring system of claim 1, wherein the pipe liner expansion tool comprises:
a first handle;
a second handle pivotably connected to the first handle;
an expansion head releasably attached to the first handle, wherein the expansion head is adapted for insertion within the first open end of the pipe liner, and wherein the expansion head is radially expandable to radially expand the pipe liner; and
a drive connected between the second handle and the expansion head, wherein the drive is operable in response to pivotal motion of the second handle relative to the first handle to cause the expansion head to radially expand.

6. The pipe liner re-flaring system of claim 1, wherein the pipe liner flaring tool comprises:

a substantially frusto-conical-shaped tip, wherein the tip is adapted for insertion within the first open end of the pipe liner and is operable to radially flare the first open end; and a handle connected to the tip for manually manipulating the pipe liner flaring tool.

7. A pipe liner re-flaring system, comprising:

a first pipe containing a pipe liner, wherein the pipe liner includes a first portion and a first open end, wherein the first open end is exposed;

a second pipe including a second open end;

a compression coupling having a first end, a second end, and a central section between the first and second ends;

wherein the central section has a hollow interior with an inner surface;

wherein the first end is adapted to be secured to the first pipe with the first portion and first open end of the pipe liner enclosed within the hollow interior;

wherein the second end is adapted to be secured to the second pipe with the second open end of the second pipe enclosed within the hollow interior in direct contact with the first open end of the pipe liner;

wherein the first portion of the pipe liner has been radially expanded to be in contact with the inner surface of the central section of the compression coupling; and wherein the first open end of the pipe liner has been radially flared where the first open end is to be in contact with the second open end of the second pipe;

wherein the second open end of the second pipe being enclosed within the hollow interior in direct contact with the first open end of the pipe liner includes the second open end of the second pipe being within the first open end of the pipe liner.

8. The pipe liner re-flaring system of claim 7, wherein:

the first end of the compression coupling comprises a first female compression fitting;

the second end of the compression coupling comprises a second female compression fitting; and the central section of the compression coupling comprises a male compression fitting.

9. The pipe liner re-flaring system of claim 8, wherein:

the first female compression fitting has a first adjustable collar for securing to the first pipe; and the second female compression fitting has a second adjustable collar for securing to the second pipe.

10. The pipe liner re-flaring system of claim 7 wherein the first portion of the pipe liner has been radially expanded by a pipe liner expansion tool comprising:

a first handle;

a second handle pivotably connected to the first handle;

an expansion head releasably attached to the first handle, wherein the expansion head is adapted for insertion within the first open end of the pipe liner, and wherein the expansion head is radially expandable to radially expand the pipe liner; and a drive connected between the second handle and the expansion head, wherein the drive is operable in response to pivotal motion of the second handle relative to the first handle to cause the expansion head to radially expand.

11. The pipe liner re-flaring system of claim 7 wherein the first open end of the pipe liner has been radially flared by a pipe liner flaring tool comprising:

a substantially frusto-conical-shaped tip, wherein the tip is adapted for insertion within the first open end of the pipe liner and is operable to radially flare the first open end; and a handle connected to the tip for manually manipulating the pipe liner flaring tool.

\* \* \* \* \*